United States Patent
Zhang et al.

(10) Patent No.: US 9,041,329 B2
(45) Date of Patent: May 26, 2015

(54) VEHICLE ELECTRIC MACHINE CONTROL STRATEGY

(71) Applicant: FORD GLOBAL TECHNOLOGIES, LLC, Dearborn, MI (US)

(72) Inventors: Yuan Zhang, Novi, MI (US); Michael W. Degner, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 196 days.

(21) Appl. No.: 13/622,768

(22) Filed: Sep. 19, 2012

(65) Prior Publication Data

US 2014/0077737 A1   Mar. 20, 2014

(51) Int. Cl.
| | |
|---|---|
| *H02P 6/18* | (2006.01) |
| *H02P 27/00* | (2006.01) |
| *B60L 9/00* | (2006.01) |
| *B60L 15/20* | (2006.01) |
| *B60L 3/00* | (2006.01) |
| *B60L 11/14* | (2006.01) |
| *B60L 11/18* | (2006.01) |

(52) U.S. Cl.
CPC .............. *B60L 15/20* (2013.01); *Y02T 10/7005* (2013.01); *B60L 3/0046* (2013.01); *B60L 3/0069* (2013.01); *B60L 11/14* (2013.01); *B60L 11/1861* (2013.01); *B60L 2240/421* (2013.01); *B60L 2240/547* (2013.01); *B60L 2240/527* (2013.01); *Y02T 10/7077* (2013.01); *Y02T 10/7044* (2013.01); *Y02T 10/705* (2013.01); *Y02T 10/7275* (2013.01); *Y02T 10/642* (2013.01); *Y02T 10/70* (2013.01)

(58) Field of Classification Search
USPC .......... 180/65.265; 318/400.34, 459, 52, 564; 361/236–244; 701/22
See application file for complete search history.

(56) References Cited

U.S. PATENT DOCUMENTS

| | | | |
|---|---|---|---|
| 7,109,686 | B2 | 9/2006 | Schulte et al. |
| 7,459,888 | B2 | 12/2008 | Schulte et al. |
| 7,633,271 | B2 | 12/2009 | Schulte et al. |
| 8,022,569 | B2 | 9/2011 | Chen et al. |
| 8,039,993 | B2 | 10/2011 | Kaplan |
| 8,140,204 | B2 | 3/2012 | Okubo et al. |
| 2004/0080165 | A1 | 4/2004 | Geis et al. |
| 2005/0068003 | A1 | 3/2005 | Gauthier et al. |
| 2009/0230909 | A1* | 9/2009 | Hiti et al. ...................... 318/564 |
| 2010/0094497 | A1* | 4/2010 | Oyobe et al. .................... 701/22 |
| 2010/0299012 | A1* | 11/2010 | Kozarekar ....................... 701/22 |
| 2012/0161679 | A1* | 6/2012 | Goldammer et al. ...... 318/400.3 |

* cited by examiner

*Primary Examiner* — Bentsu Ro
*Assistant Examiner* — Zemenay Truneh
(74) *Attorney, Agent, or Firm* — David B. Kelley; Brooks Kushman P.C.

(57) ABSTRACT

A vehicle having a traction battery and at least one electric machine for propelling the vehicle is provided. A high voltage DC bus electrically connects the traction battery to the electric machine. A controller monitors and commands power flow through the DC bus, the electric machine, and the battery. In response to a key-off event, the controller immediately discharges the DC bus by providing a current to the electric machines. This discharge continues until the voltage on the DC bus reaches a threshold. As the speed of the electric machine decreases towards a speed threshold, the voltage in the DC bus is maintained. Once the electric machine speed reduces past the threshold, the DC bus discharges the remaining voltage in the DC bus at a rate slower than the first immediate discharge.

7 Claims, 4 Drawing Sheets

VEHICLE ELECTRIC MACHINE CONTROL STRATEGY

TECHNICAL FIELD

The present disclosure relates to electric vehicles and hybrid electric vehicles, and in particular, to discharging energy in a high voltage bus that couples a high voltage battery to an electric machine.

BACKGROUND

Battery electric vehicles (BEVs) include a fraction battery that is rechargeable from an external electric power source and powers the electric machine. Hybrid electric vehicles (HEVs) include an internal combustion engine, one or more electric machines, and a fraction battery that at least partially powers the electric machine. Plug-in hybrid electric vehicles (PHEVs) are similar to HEVs but the traction battery in a PHEV is capable of recharging from an external electric power source. These vehicles are examples of vehicles that are capable of being at least partially driven by an electric machine that is coupled to a traction battery via a high voltage DC bus.

In these vehicles, certain events require discharging of the DC bus quickly, such as key-off events, in which a controller in the vehicle activates the discharge of the DC bus. The discharging reduces the DC bus voltage to an amount to prevent issues. It is therefore desirable for the discharging to start and finish as quickly as possible.

SUMMARY

In one embodiment, a method of controlling voltage on a bus comprises discharging the bus at a first rate until a voltage on the bus achieves a threshold voltage. This discharging of the bus occurs while a speed of an electric machine electrically connected with the bus exceeds a threshold speed. In response to the voltage achieving the threshold voltage, the voltage is maintained in the bus while the speed decreases toward the threshold speed. In response to the speed achieving the threshold speed, the bus is discharged at a second rate less than the first rate such that energy dissipated during the bus discharging is greater than energy released by the electric machine windings during the speed reduction. This maintains the voltage to remain below the threshold voltage.

In another embodiment, a vehicle includes an electric machine, a DC bus, and at least one controller. The DC bus is electrically connected with the electric machine. The controller(s) is configured to, in response to a request to discharge the DC bus while a back electromotive force of the electric machine exceeds a predetermined threshold voltage, apply a current to the electric machine. The current discharge a voltage of the DC bus to approximately the predetermined threshold voltage. The discharge occurs while the back electromotive force of the electric machine exceeds the predetermined threshold voltage. In response to the back electromotive force being below the predetermined threshold voltage, the controller(s) gradually discharges the voltage of the DC bus to approximately zero.

In yet another embodiment, a method of controlling voltage in a high voltage DC bus of a vehicle is provided. The voltage in a DC bus is discharged at a first discharge rate until the voltage decreases to a voltage safety threshold. The voltage is maintained at generally the voltage safety threshold until rotational speeds of each of at least two electric machines decreases to respective speed thresholds. In response to the rotational speeds of the electric machines reaching their respective speed thresholds, the voltage in the DC bus is discharged at a second discharge rate less than the first discharge rate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
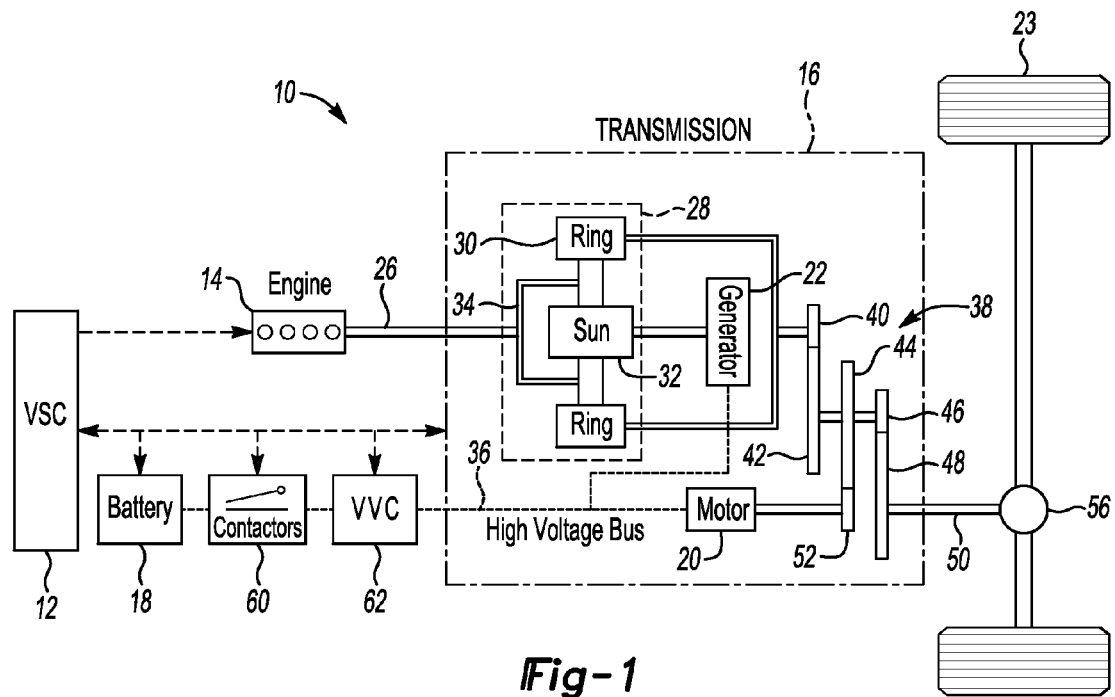
FIG. 1 is a schematic of a power-split hybrid electric vehicle.

Referring to FIG. 1, a vehicle 10 is illustrated with a power-split powertrain. A vehicle system controller (VSC) 12 is provided, and can generally be referred to as a controller. The VSC 12 controls the power distribution in the powertrain or driveline of the vehicle 10. The VSC 12 controls an internal combustion engine (ICE) or engine 14 that provides mechanical torque to the transmission 16.

The VSC 12 also controls a traction battery or battery 18. The battery 18 has a two-way electrical connection, such that it supplies energy to and receives energy from an electric traction motor 20 and a generator 22. The motor 20 can operate as a motor by transmitting torque to wheels 23 of the vehicle. Alternatively, the motor 20 and can operate as a generator by converting torque from the wheels 23, for example, into electrical energy to be stored in the battery 18 through regenerative braking.

Similar to the motor 20, the generator 22 can operate as a generator by converting torque from the engine 14 or the wheels 23, for example, into electrical energy to be stored in the battery 18. Alternatively, the generator 22 can operate as a motor by transmitting torque through the transmission and back into the engine 14 to start the engine, for example.

The motor 20 and generator 22 can interchangeably operate as either a motor or a generator, and therefore both devices can be generally referred to as electric machines. Both electric machines 20, 22 can generate torque and output torque in other known methods. It should be understood that in other vehicle configurations, a fewer or greater number of electric machines may be utilized.

Although the control system of the vehicle 10 is illustrated with a VSC 12, such a control system can include more than one controller as desired. For example, a separate battery control module can directly control the battery 18. Furthermore, a separate motor control module can be directly connected to the motor 20 and to the other controllers in the vehicle 10. It should be understood that all contemplated controllers in the vehicle 10 can be referred to as a "controller," and the VSC 12 is not necessarily limited to only one controller.

In operation, the engine 14 delivers power to a torque input shaft 26 that is connected to a planetary gear set 28 via a one way clutch (not shown). The input shaft 26 powers the planetary gear set 28. The planetary gear set 28 includes a ring gear 30, a sun gear 32, and a planetary carrier assembly 34. The input shaft 26 is driveably connected to the carrier assembly 34 which, when powered, can rotate the ring gear 30 and/or the sun gear 32. The sun gear 32 is driveably connected to the generator 22. The generator 22 may be engaged with the sun gear 32, such that the generator 22 may either rotate with the sun gear 32, or not rotate with it.

When the engine 14 is driveably coupled to the planetary gear set 28, the generator 22 generates energy as a reactionary element to the operation of the planetary gear set 28. Electric energy generated from the generator 22 is transferred to the battery 18 through a high voltage DC bus 36. The battery 18 also receives and stores electric energy through regenerative braking in known fashion. The battery 18 supplies the stored electric energy through the DC bus 36 to the motor 20 for operation. The portion of the power delivered from the engine 14 to the generator 22 may also be transmitted directly through the DC bus 36 to the motor 20. The battery 18, motor 20, and generator 22 are each interconnected in a two-way electric flow path through the DC bus 36. The VSC 12 controls the components in the powertrain to provide proper torque distribution to the wheels 23.

The vehicle may be powered by the engine 14 alone, by the battery 18 and motor 20 alone, or by a combination of the engine 14 with the battery 18 and motor 20.

In a mechanical drive mode, or a first mode of operation, the engine 14 is activated to deliver torque through the planetary gear set 28. The ring gear 30 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the mechanical drive mode, the motor 20 may also be activated to assist the engine 14 in powering the transmission 16. When the motor 20 is active in assisting, gear 52 distributes torque to gear 44 and to the countershaft.

In an electric drive mode (EV mode), or a second mode of operation, the engine 14 is disabled or otherwise prevented from distributing torque to the torque output shaft 50. In the EV mode, the battery 18 powers the motor 20 to distribute torque through the step ratio gears 38 and to the torque output shaft 50. The torque output shaft 50 is connected to a differential and axle mechanism 56 which distributes torque to the wheels 23. The VSC 12 controls each of the engine 14, the battery 18, the motor 20, and the generator 22 to distribute torque to the wheels 23 in either the mechanical drive mode or the EV mode according to driver torque demands.

It should be understood that while a power-split powertrain is illustrated in the vehicle 10, the vehicle 10 may include many other powertrain configurations. As such, it is contemplated that individual components of the powertrain may differ to suit various particular applications. For example, in another configuration that does not include a planetary gear set 28, an electric machine may be provided to operate as a generator by selectively receiving torque from the engine via a clutch, while the same electric machine may also operate as a motor by receiving power from the traction battery and providing torque through the transmission with the engine disabled and the clutch open. Other vehicle configurations of vehicle powertrains and implementations of electric machines are contemplated, and are therefore considered to be within the scope of the present disclosure.

At least one contactor 60 including at least one switch is provided between the battery 18 and the high voltage DC bus 36. The VSC 12 controls the operation of the contactor 60, in which the VSC 12 commands the contactor to open or close. The contactor 60 selectively enables and disables electric flow between the battery 18 and the electric machines 20, 22 when the contactor is closed and open, respectively.

A variable voltage converter (VVC) 62 can also be disposed between the battery 18 and the electric machines 20, 22. The VVC 62 receives high voltage DC power from the battery 18 and boosts the voltage potential that enters the electric machines 20, 22 and their respective inverters.

Figure 2:
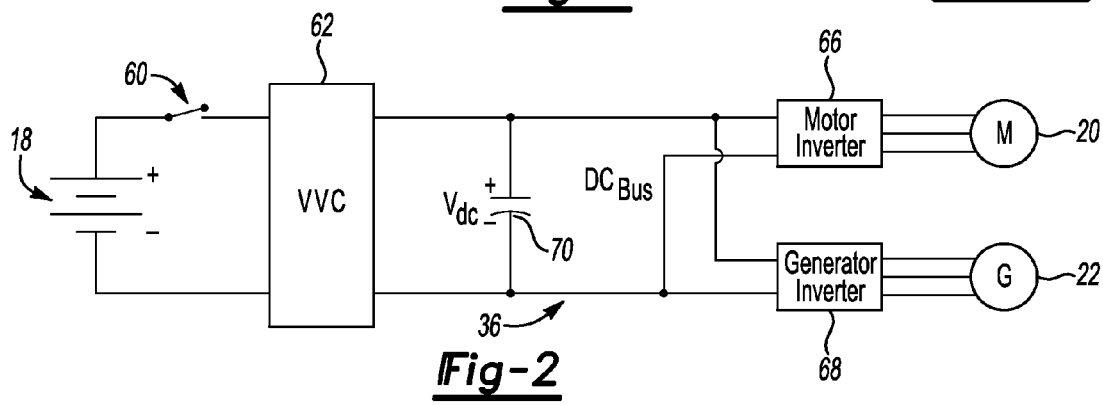
FIG. 2 is a schematic of an electric machine drive including electric machines, a high voltage DC bus, and a traction battery.

Referring to FIGS. 1 and 2, a block diagram illustrates a configuration of electric drive components in which electric power flow can occur between the battery 18 and the electric machines 20, 22. As described above, the VVC 62 boosts the voltage potential from the battery 18. The boosted voltage enters a motor inverter 66 and a generator inverter 68. The inverters 66, 68 convert the high voltage DC power into AC power to power the respective electric machines 20, 22. Before the DC power enters the inverters 66, 68, a capacitor 70 stabilizes the voltage in the DC bus 36 and works to smooth out any voltage ripples or spikes.

It should be understood that the inverters 66, 68, while illustrated as being separate, can be one common inverter for converting all DC power into one AC output. Furthermore, each of the battery 18, electric machines 20, 22, contactors 60, VVC 62, and inverters 66, 68 are controlled by the VSC 12 or one or more other controllers. The VSC 12 or other controllers command the selective operation of each of these components to properly transfer power along the DC bus 36 to meet desired torque and power demands as dictated by the driver of the vehicle 10.

Certain vehicle events, such as a key-off, require the voltage residing in the DC bus 36 to be discharged. To do so, the VSC commands the switch or contactor 60 to open and commands a discharge algorithm to discharge the voltage in the DC bus 36 below a voltage safety threshold. The voltage safety threshold can be, for example, about 50 volts. The DC bus 36 is therefore required to discharge as soon as possible.

If the key-off event, or other triggering event, occurs while the electric machines 20, 22 are running, the discharge can be delayed and may not start until the speeds of the electric machines drop below a threshold level. This is due to the back electromotive force (EMF) produced by the electric machines 20, 22. However, since fast discharging of the DC bus 36 is desirable, the control algorithm controlling the discharge should account for the back EMF and discharge the voltage in the DC bus 36 quickly without waiting for the electric machine speeds to drop below a threshold. Such an algorithm is illustrated in FIG. 3.

Figure 3:
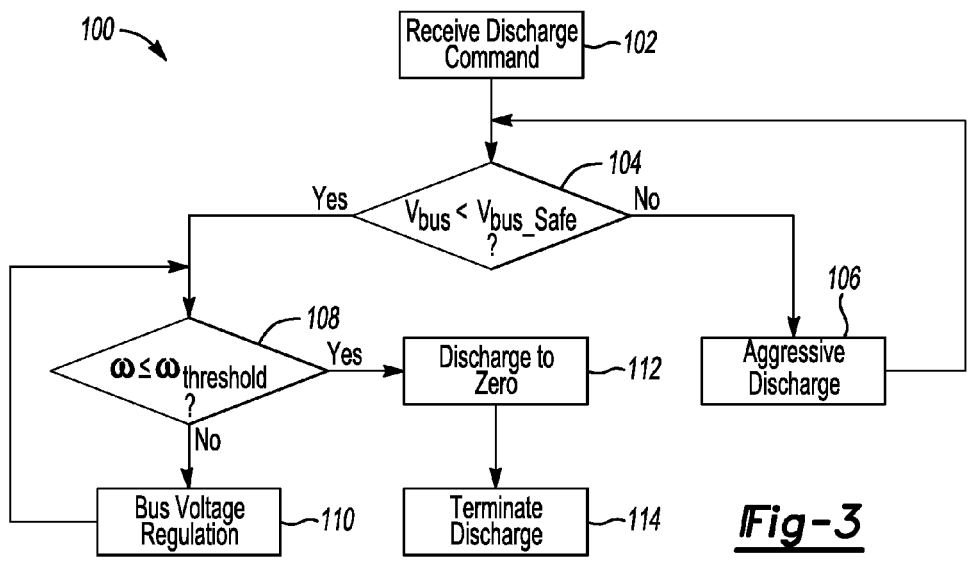
FIG. 3 is a flowchart illustrating an algorithm for discharging voltage in the high voltage DC bus.

Referring to FIG. 3, an algorithm 100 for implementing a quick discharge of the DC bus 36 is shown. A controller (such as VSC 12) implements the algorithm 100 to reduce and/or eliminate the voltage in the DC bus 36 quickly to reduce potential hazards.

At operation 102, the controller receives a command to discharge the voltage residing in the DC bus 36. Events described above, such as the driver turning the key OFF to power down the vehicle, trigger the controller to receive the discharge command.

At operation 104, the controller determines whether the voltage in the high voltage DC bus 36 is below a voltage safety threshold. The safety threshold can be a predetermined value, such as 50 volts. In another embodiment, the safety threshold is between 0 volts and 50 volts. The safety threshold can be set for any predetermined value, and can vary between different vehicles. Sensors placed throughout the DC bus 36 inform the controller of the voltage.

If the voltage in the DC bus 36 is not below the safety threshold, the controller commands an aggressive discharge at operation 106. A large current is applied to the electric machines 20, 22. The voltage in the DC bus 36 is brought down at a first discharge rate that is a high discharge rate due to losses in the electric machines and inverter. The current applied to the electric machines 20, 22 is of a manner that does not produce any torque to be output by the electric machines 20, 22. The aggressive discharge continues at operation 106 until the voltage in the DC bus 36 falls below the voltage safety threshold.

Once the voltage is below the voltage safety threshold, the controller analyzes the speed of the electric machines at operation 108. The controller determines whether the rotational speed of either or both of the motor 20 and the generator 22 is above a speed threshold. The rotational speed in the electric machines 20, 22 is proportional to the amount of back EMF present in the electric machines 20, 22. The speed threshold can be any predetermined speed. There can be two different speed thresholds for the motor 20 and generator 22.

If, at operation 108, the controller determines that the rotational speeds of the electric machines are not below their respective thresholds, the controller regulates the voltage in the DC bus 36 with bus voltage regulation at operation 110. First, a current (d-axis current) is sent to one of the electric machines 20, 22 according to equation 1 below:

$$i_{disch\_cmd} = \frac{V_{dc}}{\omega_{re}} K_1 - K_2 \qquad (1)$$

where $i_{disch\_cmd}$ is the commanded current to discharge or manage the voltage in the DC bus 36, $V_{dc}$ is the voltage in the DC bus 36, $\omega_{re}$ is the angular velocity of the rotor in the electric machine 20, 22, and $K_1$ and $K_2$ are preset constants. The controller can also produce the d-axis current command by using an error in the commanded modulation index and the actual modulation index. The d-axis current ensures that the electric machines 20, 22 operate within their voltage limit. This current does not provide real power to the electric machines 20, 22.

After applying the d-axis current to the electric machines, the controller then produces a real current (q-axis current) command to regulate the voltage in the DC bus 36. The controller can produce the real current command by using an error in the comparison of the commanded DC bus voltage and the actual voltage. The produced real current command regulates the voltage in the DC bus 36 by providing real power from the DC bus 36 to the electric machines 20, 22.

A two-way flow of electrical energy exists between the electric machines 20, 22 and the DC bus 36. During the bus regulation in operation 110, the VSC 12 determines the voltage in the DC bus 36 and the electric machines 20, 22. Based on the comparison of the voltages, the VSC 12 regulates the voltage in the DC bus 36 to be generally constant at approximately a predetermined threshold voltage. For example, if the voltage in the DC bus 36 drops below a regulation threshold, the VSC 12 commands at least one of the electric machines 20, 22 to provide power to the DC bus 36, particularly the capacitor 70, thereby increasing the voltage in the DC bus 36. Alternatively, if the voltage in the DC bus 36 spikes above the regulation threshold during the voltage regulation, the VSC 12 commands the DC bus 36 to apply a real current from the capacitor 70 to the electric machines 20, 22 to balance and regulate the voltage in the DC bus 36. The DC bus voltage regulation prevents the voltage in the DC bus 36 from decreasing to a very low level and causing one of the electric machines 20, 22 to receive a boost in current before the speed of the electric machines 20, 22 has dropped below the speed threshold.

The bus voltage regulation at 110 continues while the speed of the electric machines 20, 22 reduces. Once the rotational speed of the electric machines 20, 22 has reduced below the speed threshold at operation 108, the controller commands the d-axis current $i_{disch\_cmd}$ applied to the electric machines 20, 22 to reduce to zero such that the voltage in the DC bus 36 does not increase, and the real current is similarly applied to reduce to zero to discharge the voltage in the DC bus 36 towards zero. This discharge rate is accomplished at a second rate that is slower than the first aggressive discharge rate. This discharging rate at operation 112 can be of various discharge profiles, as will be discussed with reference to FIGS. 6A-6D below.

After the speeds of the electric machines 20, 22 reduce below the speed threshold, the discharge at operation 112 ensures that the losses consumed by discharge current (inverter loss, machine winding loss, DC bus loss) are larger than the energy released by the copper windings in the electric machines 20, 22. This prevents the DC bus 36 voltage from increasing once discharging ceases. The controller terminates the discharging at the second discharge rate at operation 114. A bleeding resistor can be connected to the DC bus 36 to consume any residual energy in the capacitor 70 even after the discharging has been terminated by the controller.

Figure 4A:
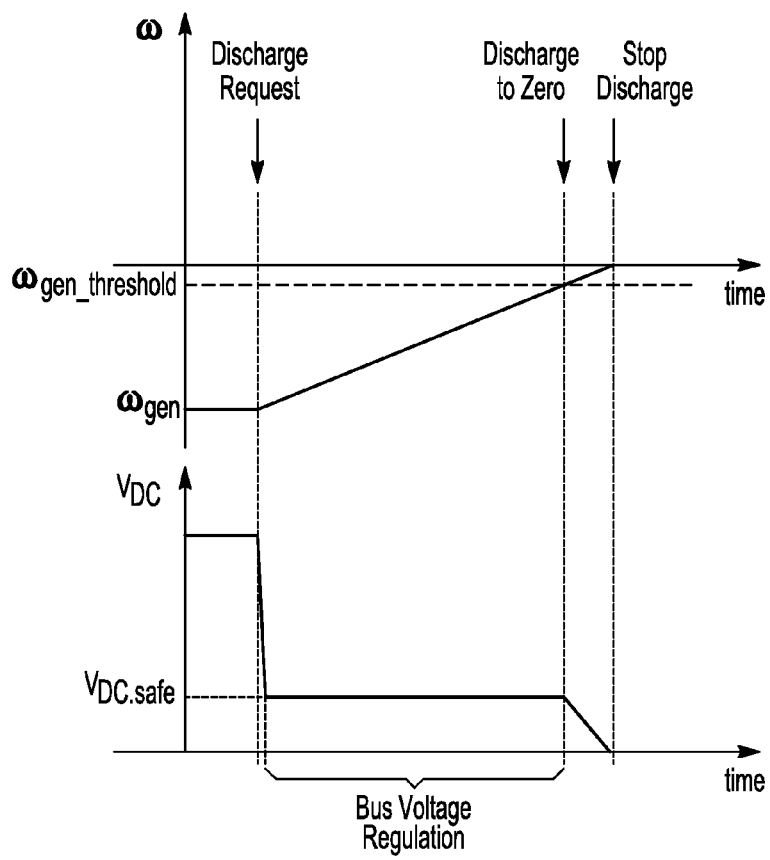
FIGS. 4A-4B are graphical illustrations showing high voltage DC bus discharge rate as a function of rotational speed of an electric machine.
Figure 4B:
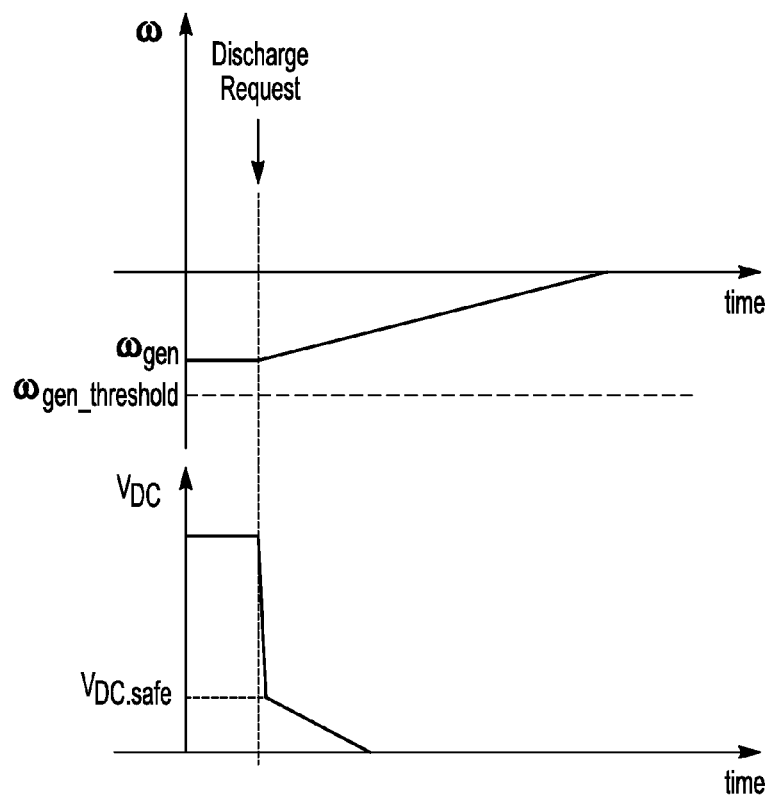

Referring to FIGS. 4A-4B, the relationship between the discharge voltage in the DC bus 36 (voltage in the DC bus 36 while current is discharged) and the rotational speed of an electric machine 20, 22 is illustrated over time. FIGS. 4A and 4B refer to the rotational speed of the generator 22, but it should be understood that the illustrations can apply to the rotational speed of the motor 20 as well.

Referring to FIGS. 3 and 4A, a graph displaying an example of the discharge voltage over time according to the algorithm 100 is illustrated. A discharge command (e.g., keyoff) is received (operation 102) while the rotational speed of the generator 22 exceeds the generator speed threshold and the voltage in the DC bus 36 exceeds the safe threshold voltage. It should be understood that the generator speed is illustrated to be negative due to the relative directional rotation of the generator 22 as compared with the relative directional rotation of the motor 20.

Immediately following the discharge command, the voltage is aggressively discharged (operation 106) until reaching the voltage safety threshold (operation 104). Once the voltage is at a safe level, the bus voltage regulation (operation 110) maintains the voltage in the DC bus 36 until the rotational speed of the generator 22 has reached a speed threshold (operation 108).

Once the rotational speed of the generator 22 has reduced below the speed threshold, the controller reduces the discharge current to zero (operation 112), according to the profiles described with reference to FIGS. 6A-6D below. The voltage in the DC bus correspondingly reduces. The discharge terminates (operation 114) once the voltage has reached about zero volts.

Referring to FIGS. 3 and 4B, another graph displaying an example of discharge voltage is displayed. In this example, the rotational speed of the generator 22 is already less than the speed threshold when the discharge request is received (operation 102). The controller commands an immediate aggressive discharge (operation 106) until the voltage reaches the safe threshold voltage. Since the rotational speed of the generator 22 is below the rotational speed threshold, immediately following the aggressive discharge, the controller reduces the discharge current toward zero (operation 112) according to the profiles described below.

Figure 5A:
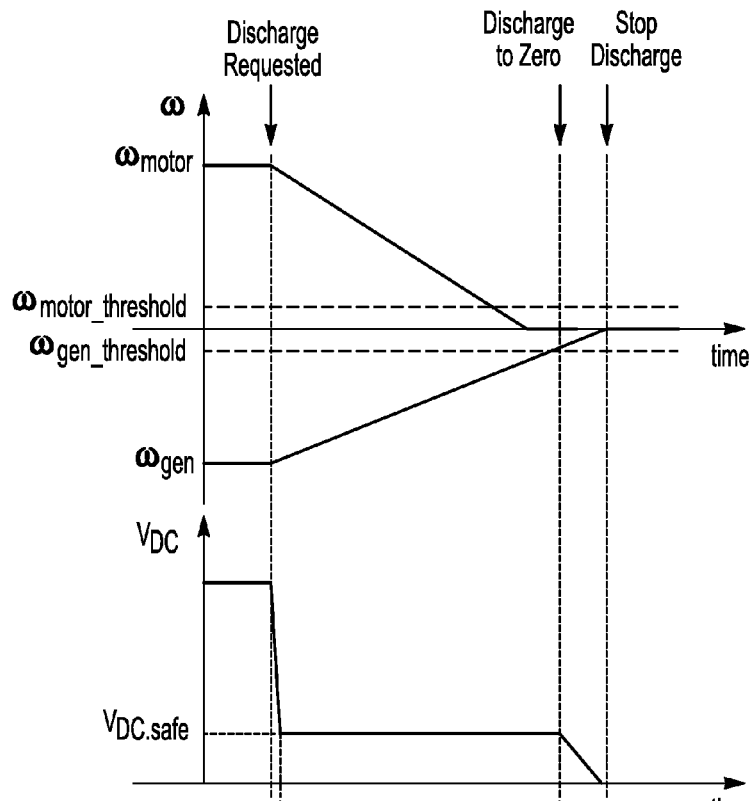
FIGS. 5A-5B are graphical illustrations showing high voltage DC bus discharge rates as a function of rotational speeds of two electric machines.
Figure 5B:
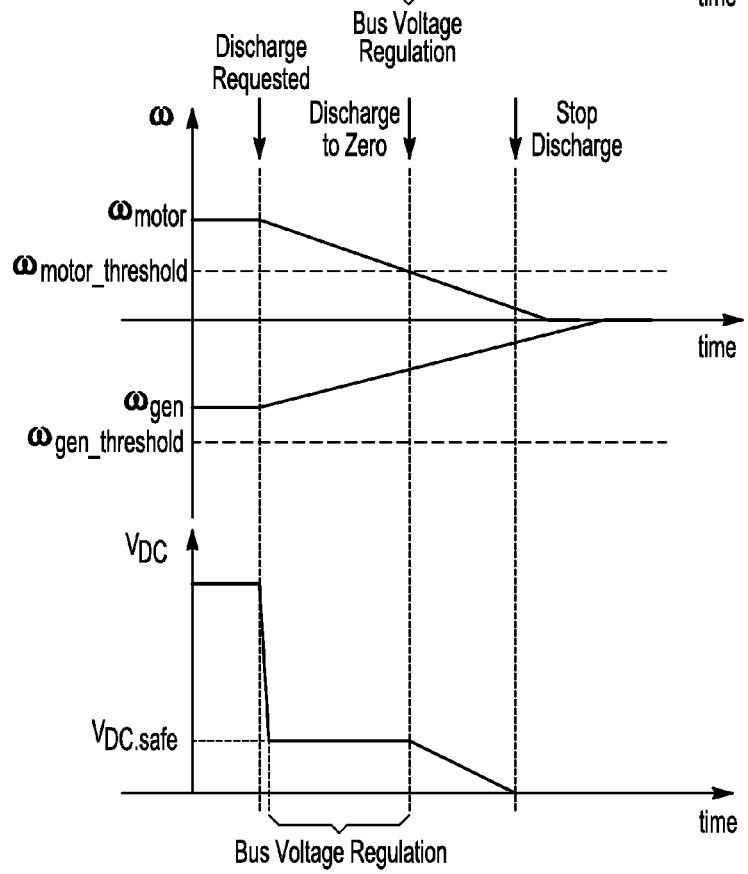

Referring to FIGS. 5A-5B, the relationship between the discharge of the voltage in the DC bus 36 and the rotational speed of both electric machine 20, 22 is illustrated over time. In these figures, the rotational speeds of the motor 20 and the generator 22 are shown separately to illustrate that the rotational speeds and their respective thresholds may differ between the electric machines 20, 22 while the controller commands the discharge algorithm 100 of FIG. 3.

Referring to FIGS. 3 and 5A, the rotational speeds of the motor 20 and the generator 22 exceed their respective thresholds and the DC bus voltage exceeds the safe threshold voltage while the discharge request is received (operation 102).

Once the discharge is requested, the voltage in the DC bus 36 is discharged aggressively (operation 106) by applying a current to either or both of the electric machines 20, 22. The voltage in the DC bus 36 quickly reduces below the safety threshold, whereupon the voltage is regulated (operation 110).

After the rotational speeds of both electric machines 20, 22 have fallen below the speed thresholds, the controller controls the discharge current in the DC bus 36 according to the profiles described with reference to FIGS. 6A-6D below (operation 112). The voltage on the DC bus 36 correspondingly reduces. The discharge ceases when the voltage on the DC bus 36 has reached zero volts.

Referring to FIGS. 3 and 5B, a graph is shown again with both electric machine speeds illustrated. In this example, the rotational speed of the motor 20 is above the speed threshold while the rotational speed of the generator 22 is below the speed threshold. In such a scenario, after an aggressive discharge of the voltage (operation 106), the controller regulates the voltage in the DC bus 36 until the rotational speed of the motor 20 is below the speed threshold (operation 110). Once rotational speeds of both the motor 20 and generator 22 are below their respective thresholds, the discharge current is reduced toward zero according to the profiles described below (operation 112).

Referring to FIGS. 3-5, back EMF in the electric machines 20, 22 can be directly proportional to the rotational speed of the electric machines 20, 22 after the discharge request. Therefore, while rotational speeds and speed thresholds are described above, it should be understood that these speeds can be expressed in terms of a back EMF force or a voltage. Rotational speed is but one method of measuring a back EMF force in the electric machines 20, 22.

Referring to FIGS. 6A-6D, various discharge profiles are illustrated. These graphs illustrate the "discharge to zero" function in the discharge algorithm as described as operation 112 above. Once the voltage on the DC bus 36 is below the voltage safety threshold and the rotational speeds of the electric machines 20, 22 are below the speed thresholds, the controller commands the remaining current in the DC bus 36 to discharge according to various profiles.

Figure 6A:
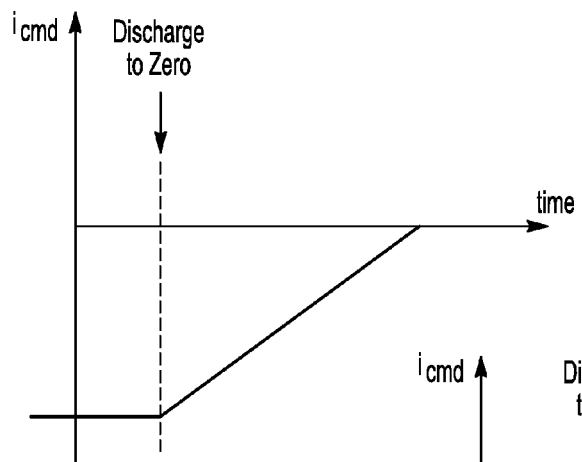
FIGS. 6A-6D are graphical illustrations showing various final discharge current profiles.
Figure 6B:
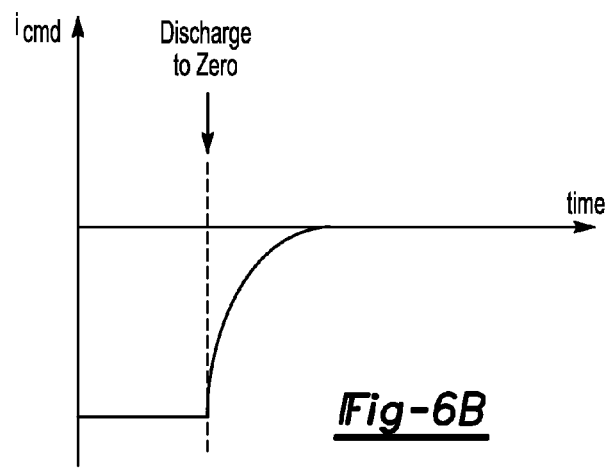
Figure 6C:
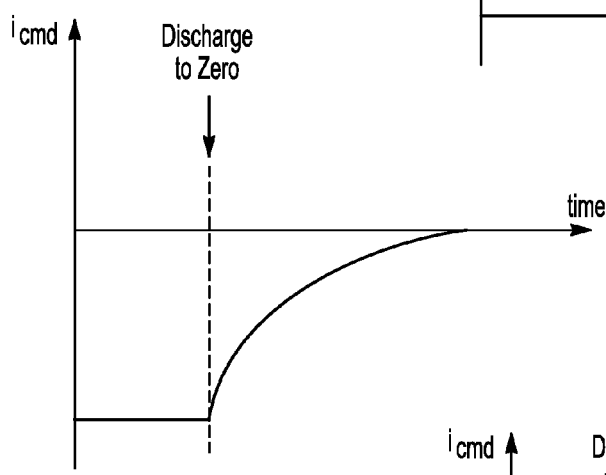
Figure 6D:
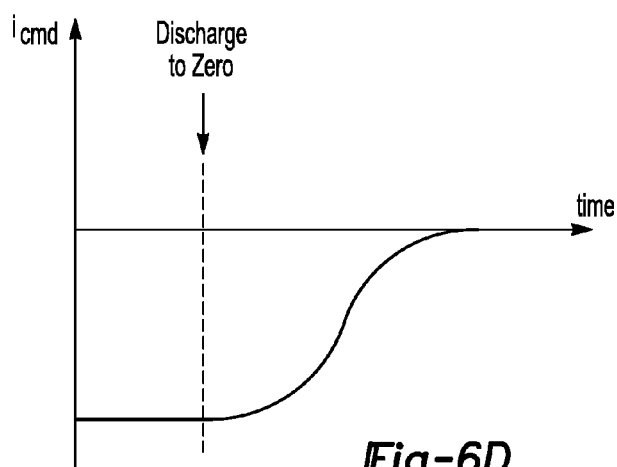

For example, the discharge rate can be a constant linear rate, as shown in FIG. 6A. The discharge rate can also be an exponential rate having various changes in rates of slope. FIGS. 6B and 6C show exponential discharge rates with the current being sent to the electric machines 20, 22 in FIG. 6B decreasing quicker than that of FIG. 6C. The discharge rate can also be of a polynomial profile, in which the rate of discharge varies while the current reduces over time as illustrated in FIG. 6D.

The discharging of current from the DC bus 36 to the electric machines 20, 22, and therefore the discharging of power out of the DC bus 36 is therefore accomplished delicately in accordance with the discharge profiles of FIGS. 6A-6D. The various discharging rates are gradual such that losses in the discharging over time are larger than the energy released from the windings in the electric machines 20, 22. Thus, the DC bus voltage will not increase to a voltage higher than the voltage safety threshold when the discharge is terminated.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling voltage on a bus comprising:
discharging the bus at a first rate, while a speed of an electric machine electrically connected with the bus exceeds a threshold speed, until a voltage on the bus achieves a threshold voltage;
in response to the voltage achieving the threshold voltage, maintaining the voltage at the threshold voltage while the speed decreases to the threshold speed; and
in response to the speed achieving the threshold speed, discharging the bus at a second rate less than the first rate such that energy dissipated during bus discharge is greater than energy released by the electric machine during speed reduction to prevent the voltage from exceeding the threshold voltage.

2. The method of claim 1, wherein maintaining the voltage at the threshold voltage while the speed decreases to the threshold speed includes providing power from the electric machine to the bus.

3. The method of claim 1, wherein maintaining the voltage at the threshold voltage while the speed decreases to the threshold speed includes providing power from the bus to electric machine.

4. A method comprising:
discharging vehicle bus voltage at a first rate until the voltage reaches a voltage-threshold;
maintaining the voltage generally at the voltage-threshold until rotational speeds of two electric machines decrease to respective speed-thresholds; and
in response to the rotational speeds each achieving the respective speed-thresholds, discharging the voltage at a second rate less than the first rate such that energy dissipated during discharging exceeds energy released by the electric machines during speed reduction from exceeding.

5. The method of claim 4, wherein maintaining the voltage generally at the voltage-threshold includes, in response to the voltage decreasing, providing power from at least one of the electric machines to the bus.

6. The method of claim 4, wherein maintaining the voltage generally at the voltage-threshold includes, in response to a voltage increase, providing power to at least one of the electric machines from the bus.

7. The method of claim 4, further comprising terminating the discharge in response to the voltage on the bus reaching about 0 volts.

* * * * *

UNITED STATES PATENT AND TRADEMARK OFFICE
CERTIFICATE OF CORRECTION

PATENT NO.        : 9,041,329 B2                                    Page 1 of 1
APPLICATION NO.   : 13/622768
DATED             : May 26, 2015
INVENTOR(S)       : Yuan Zhang et al.

It is certified that error appears in the above-identified patent and that said Letters Patent is hereby corrected as shown below:

In the Claims

Column 10, Lines 12-13, Claim 4:

After "electric machines during speed reduction"
Delete "from exceeding".

Signed and Sealed this
Fifteenth Day of September, 2015

Michelle K. Lee
*Director of the United States Patent and Trademark Office*